Figure 3:
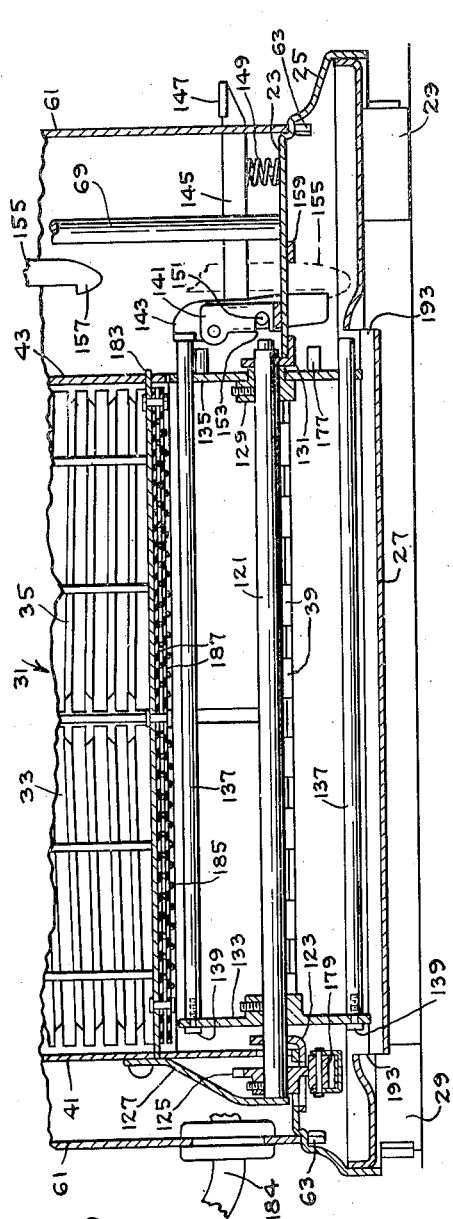

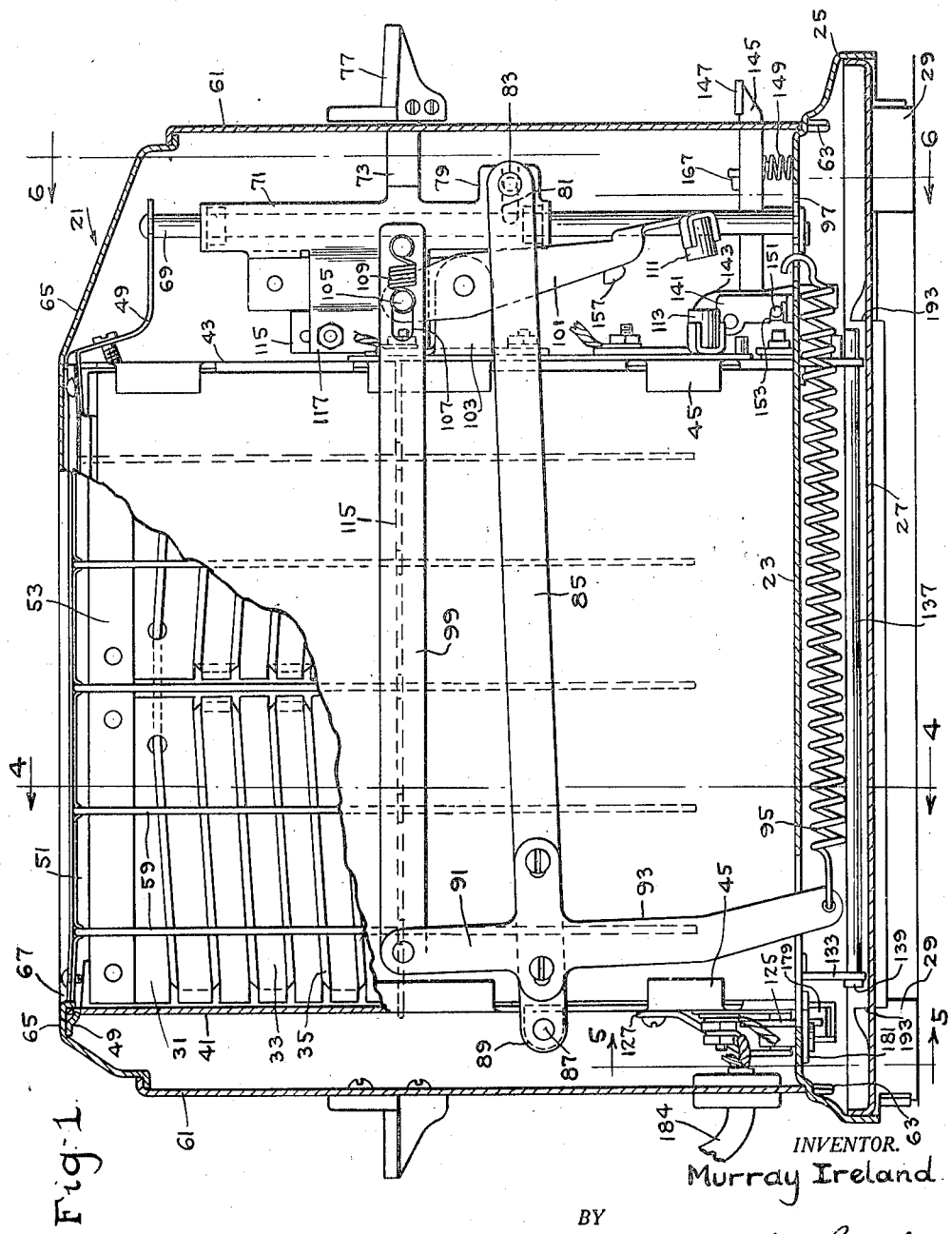

Oct. 11, 1938.                M. IRELAND                2,132,622
                           AUTOMATIC TOASTER
                         Filed March 31, 1937            4 Sheets-Sheet 2

INVENTOR.
Murray Ireland.
BY
         ATTORNEY.

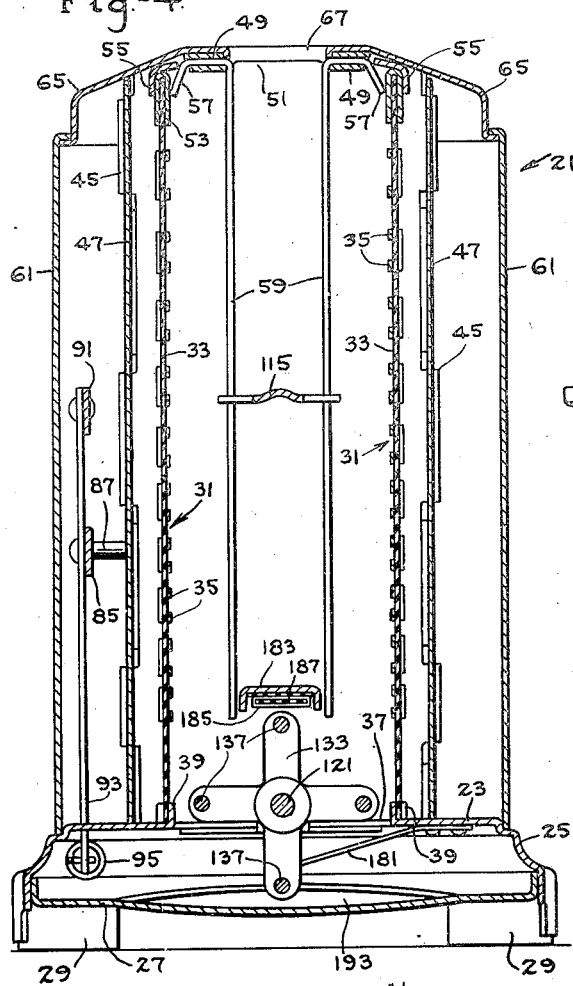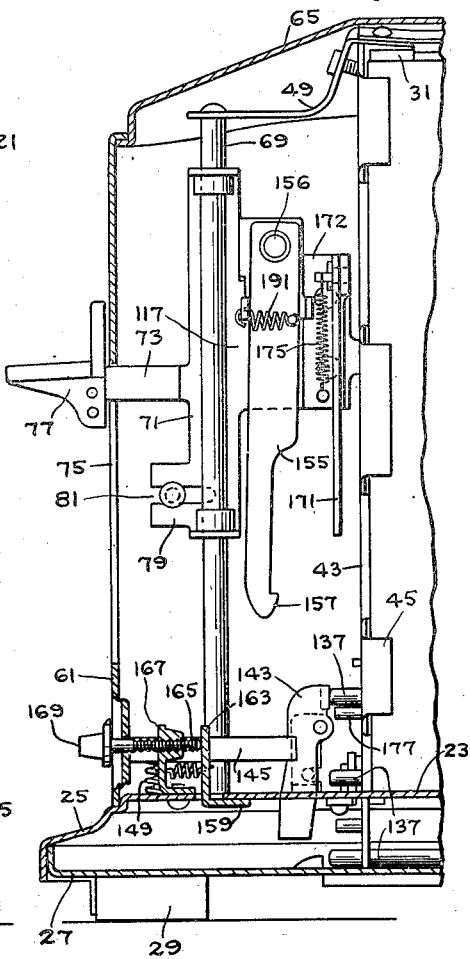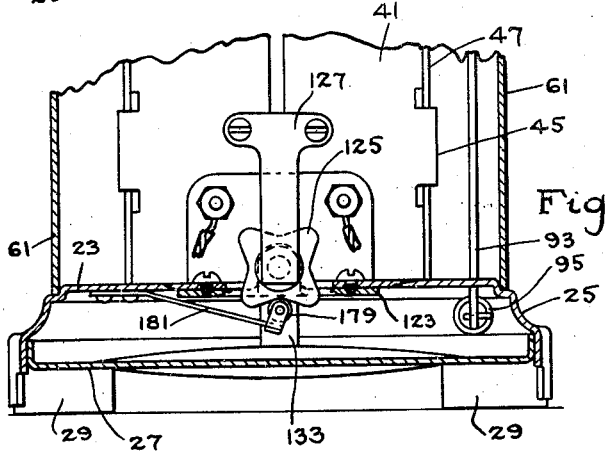

Oct. 11, 1938.  M. IRELAND  2,132,622
AUTOMATIC TOASTER
Filed March 31, 1937   4 Sheets—Sheet 4
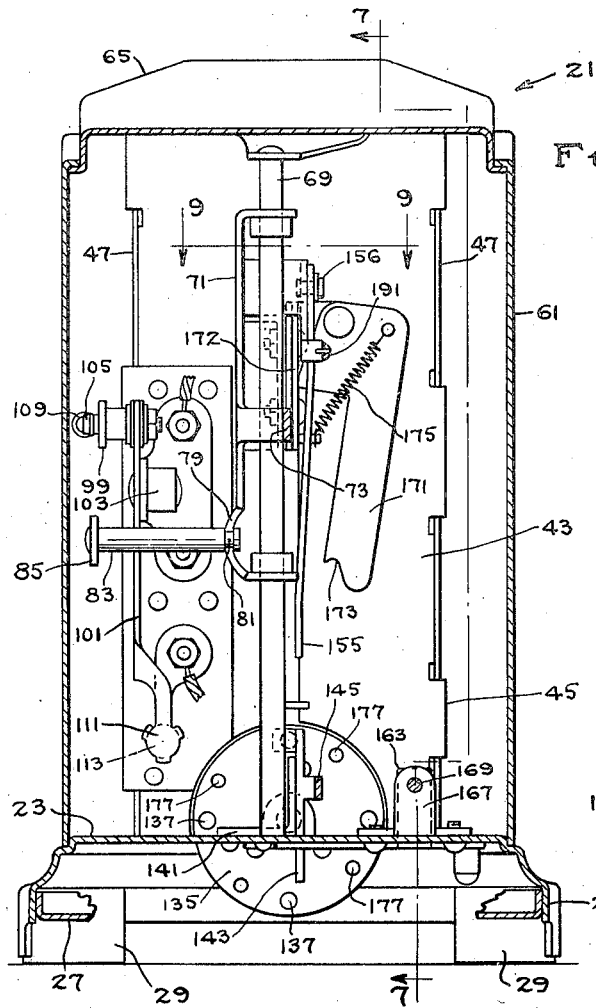
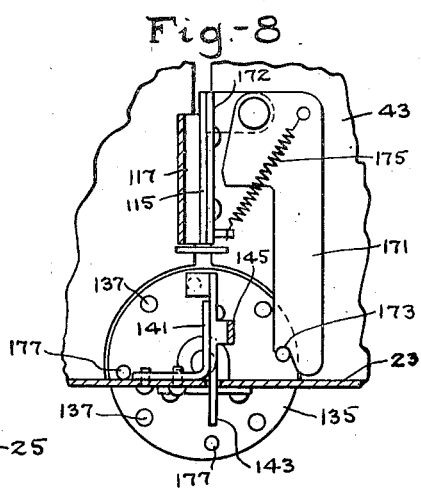
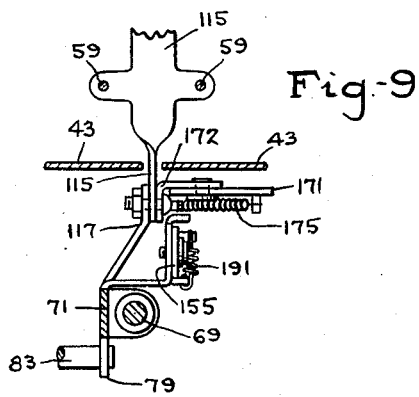
INVENTOR.
Murray Ireland
BY
ATTORNEY.

Patented Oct. 11, 1938

2,132,622

UNITED STATES PATENT OFFICE 2,132,622

AUTOMATIC TOASTER

Murray Ireland, St. Paul, Minn., assignor to McGraw Electric Company, Chicago, Ill., a corporation of Delaware Application March 31, 1937, Serial No. 134,066

10 Claims. (Cl. 219—19)

My invention relates to toasters and particularly to thermally controlled toasters for determining the duration of a toasting operation.

An object is to provide a relatively simple thermally-actuable means for controlling the length of time of a toasting operation to insure that successive slices of bread shall be toasted to the same degree.

Another object of my invention is to provide a toaster having a thermal timing means including a plurality of thermally-actuable elements one of which is operative during a toasting operation to control the duration thereof while the others are being cooled for successive toasting operation control.

Another object of my invention is to provide a thermally-actuable control means for an electric toaster, more particularly of the vertical type, which thermal control means shall be subject not only to an auxiliary heating element but also to the main heating element, to thereby compensate for temperature variations in the toaster.

Other objects of my invention will either be apparent from the description of a present embodiment of device during a description thereof or will be specifically pointed out in the course of such description.

Figure 2:
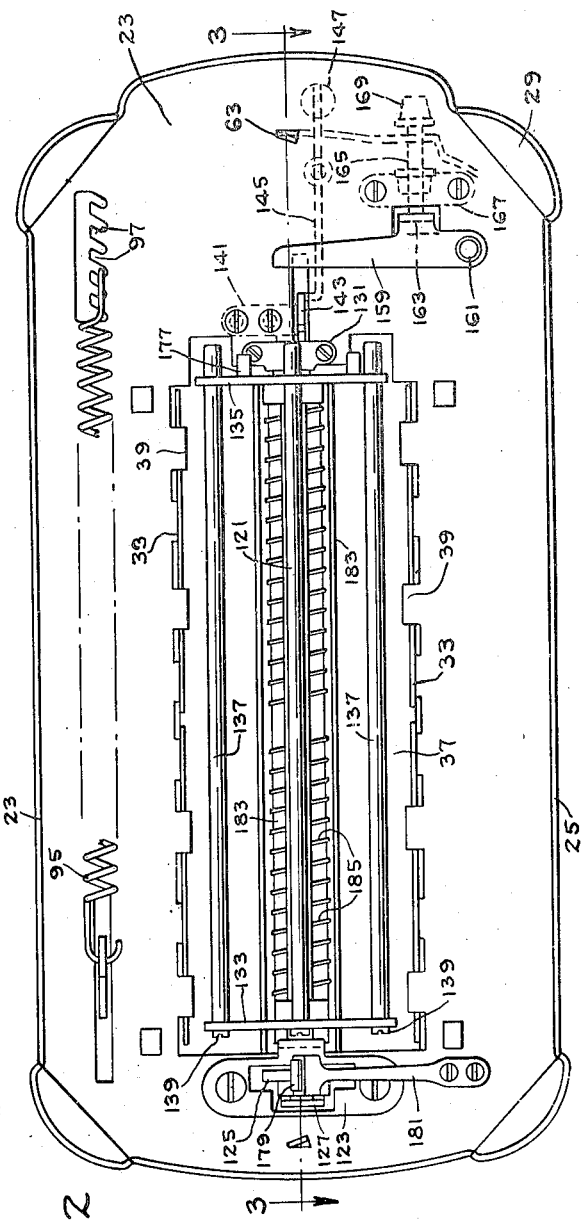

In the drawings,

Figure 1 is a view in vertical longitudinal section through a toaster embodying my invention, Fig. 2 is a bottom plan view of the assembly with the crumb tray removed, Fig. 3 is a fragmentary view showing more particularly the bottom portion of the toaster and taken on the line 3—3 of Fig. 2, Fig. 4 is a view in vertical lateral section taken on the line 4—4 of Fig. 1, Fig. 5 is a fragmentary view similar to Fig. 4 and taken on the line 5—5 of Fig. 1, Fig. 6 is a view in vertical lateral section taken on the line 6—6 of Fig. 1, Fig. 7 is a fragmentary view in vertical longitudinal section taken on the line 7—7 of Fig. 6 and showing more particularly the front part of the toaster assembly, Fig. 8 is a fragmentary view showing a part of Fig. 7, but with the elements in a partially operated position, and, Fig. 9 is a fragmentary view in horizontal section taken on the line 9—9 of Fig. 6.

A toaster 21 is here illustrated as of the single slice vertical type and includes a base plate 23 having a substantially flat top surface, a depending peripheral flange 25 which is adapted to receive a crumb tray 27, which latter may be provided with heat insulating supports 29 in a manner well known in the art. A pair of spaced electric heating elements 31 is provided, which heating elements include sheets or plates 33 of electric insulating material, such as mica, on which is wound a resistor element 35 of wire or strip, the winding being done in such manner that the major portion of the resistor is located on one face, namely, that face of each plate 33 adjacent to the other heating element so that substantially all of the heat generated in the resistors will be radiated against a slice of bread located between the heating elements.

The central portion of the base plate 23 is provided with a longitudinally extending opening 37, parts of the edge portion at each side thereof being bent upwardly as shown at 39, the lugs being spaced longitudinally of each other as is shown more particularly in Fig. 2 in order to receive therebetween and hold the lower edge of the respective plates 33.

The assembly includes further a rear intermediate wall 41 and a front intermediate wall 43 which may be made of suitable metal or of any other material and whose respective vertical edges are bent over as shown at 45 in Fig. 4 of the drawings, to receive intermediate side walls or baffle plates 47. The front and rear walls 41 and 43 are maintained in proper longitudinally spaced relation by a top frame 49 having a longitudinal opening 51 therein through which slices of bread can be inserted in and removed from the toasting chamber constituted by the spaced heating elements and the rear and front intermediate walls 41 and 43.

The upper ends of the plates 33 of the heating elements 31 may be enclosed by metal strips 53 of substantially channel shape in lateral section and the outward movement of these plates may be limited by depending flange 55 integral with the lateral edges of top frame 49 while the inward movement of the upper ends of the heating elements may be limited by depending portions 57 of guide wires 59 which rest upon and are supported by the side portions of the frame 49 in a manner well known in the art.

The assembly further includes a casing 61 which may include front, rear and two side walls, the lower edges of which have interfitting engagement with base 23 and which may be held thereagainst by lug portions 63 (see Fig. 1 of the drawings) extending through the base and twisted or bent relatively thereto. A cover 65 is associated with the casing 61 to substantially completely enclose the toasting chamber and the baffle plates 47 and is provided with a longitudinal opening 67 therein registering with opening 51 in the top frame to provide access to the toasting chamber hereinbefore described.

A rod 69 is located in a vertical position between the front intermediate wall 43 and the front wall of the casing 61, which may for convenience be called the mechanism chamber, its lower end being secured to the top of base 23 and its upper end being secured to a forward extension of top frame 49. A slider 71 is vertically movable on rod 69 and includes, in addition to a vertically extending central portion, a forwardly extending lug 73 which is long enough to extend outwardly through a slot 75 in the front wall of casing 61 and which has mounted thereon an actuating knob 77 to be used by an operator in moving the slider downwardly for a purpose to be hereinafter set forth.

The slider 71 is provided with a forward extending slotted lug 79 near its lower end, which slot 81 is adapted to receive a pin 83 secured to and extending laterally from the front end of a pivotally mounted arm 85. The arm 85 is pivotally mounted on the rear intermediate wall 41 as on a pin 87, which pin is supported by one or more brackets 89 secured against the wall 41. The arm 85 has secured thereto or integral therewith an upper arm 91 extending substantially laterally of the arm 85 and a depending extension 93, to the lower end of which there is secured one end of a helical biasing spring 95, the forward end of which is adapted to engage with one of a plurality of hook members 97 provided in the base 23.

The upper end of arm 91 is pivotally connected to one end of a link 99, the forward end of which has a lost motion connection with a switch contact arm 101 which is pivotally supported by a bracket 103 secured to the front intermediate wall 43. The upper end of arm 101 has a pin 105 secured thereto, which pin extends through a short slot 107 in the forward end of arm 99 to support the forward end of arm 99, connection therebetween being by a spring 109. The lower end of arm 101 is provided with a contact member 111 which cooperates with a fixed contact member 113 insulatedly mounted on the front wall 43. When the knob 77 is moved downwardly, the arm 85 is moved in a clockwise direction (as seen in Fig. 1) on its pivot pin 87 with the result, in part, that contact 111 engages the fixed contact 113 to thereby energize the main heating element.

Means for supporting a slice of bread is provided in the form of a horizontally extending plate 115 (see Fig. 4), which plate has lateral perforated extensions therein through which perforations the guide wires 59 extend so that these guide wires may be held in proper operative position and locate a slice of bread substantially centrally between the heating elements. The front end of bread support 115 extends through a slot in the front wall and is secured to a rearwardly extending portion 117 of slider 71 so that as the slider is moved downwardly by an operator pressing on knob 77, the bread slice support will also be moved downwardly. When the bread support 115 is in the position shown in Fig. 4 of the drawings, it is in what may be called the non-toasting position, that is a slice of bread resting thereon will have a part thereof extending above the cover 65. When the bread support is moved downwardly in the manner just described, all of a slice of bread resting thereon will be located between the main heating elements to be toasted thereby.

Substantially all of the elements thus far described are already known and used in the art and have been illustrated and described mainly for illustrative purposes since they are associated with a thermal timing mechanism to terminate the toasting operation, which timing means will now be described. A horizontal shaft 121 is located in the toasting chamber just above the base 23, the rear end thereof being supported by a bracket 123 and having mounted thereon a star wheel 125. A spring bar 127 has its upper end secured to rear wall 41 and its lower end engages the rear end of shaft 121, so that the shaft 121 will be maintained in a substantially fixed position in the toasting chamber, forward movement of the shaft being limited by a collar 129 which is fixedly mounted on the shaft at the front end thereof and abuts against a supporting bracket 131 (see Fig. 3 of the drawings).

A plural arm disk member 133 is fixedly secured on the shaft 121 near the rear end thereof and inside of the supporting bracket 123 and a disk 135 is fixedly mounted on collar 129 (see Fig. 3). A plurality of expansion rods 137, here shown as four in number, are supported by the disks 133 and 135, the rear ends of the respective expansion rods 137 being secured against the respective arms of member 133 adjacent to and within its outer periphery by short machine screws 139. The forward ends of the expansion rods 137 extend loosely through openings in the disk 135 so that upon heating and cooling of the rods as will occur during operation of the toaster, the forward ends may move relative to the collar 129.

A latching means provided to retain the switch in closed position and the bread support in its toasting position includes a bracket 141 extending upwardly from and having a part secured to the base 23 just in front of the bracket 131. Pivotally mounted thereon is a latch arm 143 which has secured thereto or integral therewith a forwardly extending portion 145 which is long enough to extend outwardly through the front wall of casing 61 where it may be provided with a flat portion 147 for manual actuation as will be set forth hereinafter. A biasing spring 149 may engage beneath the arm 145 to cause latch 143 to turn in a counter-clockwise direction (as seen in Fig. 3) as much as may be permitted by a pin 151 engaging in a slot 153 on bracket 141.

A latch member 155 is pivotally mounted at 156 on and depends from a portion of the slider 71 and has a hook shaped end 157 as shown more particularly in Fig. 7 of the drawings, the locations of the hook end 157 and of the latch 143 being such that when the slider is moved downwardly the hook end 157 will engage over the lower end of pivotally mounted latch arm 143, the position of the lower end of member 155 being shown in broken lines in Fig. 3 of the drawings.

Means for varying the amount of overlap of hook end 157 and the lower edge of member 143 may include a bar or arm 159 which may be located against the lower surface of base 23 and be pivotally movable by being mounted on a pin 161 at one end thereof. Arm 159 is provided with an upwardly projecting portion 163 which is engageable by an adjusting screw 165 suitably supported on the base as by a bracket 167, the screw extending through the front wall of casing 61 and having an actuating knob 169 mounted thereon. This provides one means for varying the duration of a toasting operation.

Means for causing a step by step rotative movement of shaft 121 and the members secured thereto including particularly the plurality of expansion rods includes an actuation arm 171 which is pivotally mounted on a rearwardly extending part 172 of slider 71 (see Fig. 6 of the drawings), the lower end of arm 171 having a recess 173 therein near to the lower end but spaced upwardly therefrom. A biasing spring 175 normally maintains arm 171 in the position shown in Fig. 6 of the drawings, where a lateral portion thereof engages against a part of member 172.

The forward disk 135 has secured thereto a plurality of short pins 177 located in definitely spaced relation relatively to the plurality of expansion rods and in such positions that one of them is engageable in the recess 173 of actuating arm 171 during the downward movement of the manually actuable elements including the slider 71 and arm 171 so that the rotator structure hereinbefore defined will be given a turning movement in a clockwise direction (as seen from the front of the toaster), the limit of movement effected by direct engagement of arm 171 and one of the pins 177 being as shown in Fig. 8 of the drawings. The star wheel 125 hereinbefore mentioned is engaged by a roller 179 mounted on a spring arm 181, one end of said spring arm being secured to the base 23 at the bottom surface thereof as is shown more particularly in Fig. 2 of the drawings. The operation of the star wheel and its cooperating biased collar is such that after the rotator has been turned to substantially the position shown in Fig. 8 of the drawings, the spring pressed roller 179 will cause further turning movement of the rotator into a position where one of the expansion rods is aligned with the latch release member, substantially as shown in Fig. 6 of the drawings.

Means for thermally energizing the expansion rods in sequence includes an elongated auxiliary heater having a support 183 which may be of channel-shape in cross-section and which may also be made of relatively light metal, an extended resistor 185 located therein and supported in any suitable or desired means here shown as narrow strip 187 of electric insulating material suitably secured to and supported by member 183. This auxiliary heater is located in the toasting chamber between the main heating elements and near to the bottom edges thereof and just above the uppermost expansion rod, as shown more particularly in Fig. 4 of the drawings, and the construction shown provides means for shielding the auxiliary heater from radiant heat directly from the main heater. The auxiliary heating element is energized and deenergized simultaneously with the main heating elements. Support 183 may be held by interengagement with front and rear walls 43 and 41. A twin conductor cord 184 may be provided in the usual manner.

Let it be assumed that an operator wishes to make toast, he will drop a slice of bread on the bread support which will normally be in the position shown in Fig. 4 of the drawings, in non-toasting position. He then depresses the manually actuable elements by pressure on knob 77, moving it all the way downwardly until hook end 157 engages over the lower end of latch 143, it being noted that arm 155 biased in a clockwise direction position by a spring 191 (see Fig. 7) so that it may ride over the lower end of arm 143. This effects closing of the switch controlling the main and the auxiliary heating elements and moving of the bread slice support into toasting position. The main and the auxiliary heating elements will heat up and while the slice of bread is being toasted the uppermost expansion rod 137, that is the one adjacent to auxiliary heating element 185, will also be heated not only by radiant heat from the auxiliary heating element, but also by heat from the lower portion of the main heating element, as is evident from Fig. 4 of the drawings. After a predetermined length of time, when the slice of bread has been toasted to the desired degree, the uppermost expansion rod aligned with the latch 143, as shown particularly in Fig. 7 of the drawings, will have expanded sufficiently to cause a turning movement of arm 143 to thereby move its lower end out of engaging relation with the hook end 157 whereby the slider and the parts operatively connected therewith will be moved back to their normal inoperative positions by spring 95, that is the bread support will be moved to its uppermost or non-toasting position while the control switch for both heating elements is moved simultaneously to its open position. It is to be understood of course that the design and construction of the main and auxiliary heaters and of the expansion rods are such that release of the latching means is effected when a slice of bread has been toasted to the desired degree.

Adjustment of screw 175 by nob 169 will vary the amount of overlap of hook end 157 with arm 143 so that it is possible to manually control the duration of a toasting cycle to thereby obtain slices of bread toasted light, medium or dark.

It is obvious of course that the temperature of the toaster structure will increase with repeated successive toasting operations and I have found that the location of the auxiliary heating element in the toasting chamber near the bottom portion thereof has the very important result that the structure of the auxiliary heating element itself will receive some heat from the main heating elements and it is possible by proper correlation of the design constants and weights of the toaster structure, of the auxiliary heater support and of the expansion rods 137 to inherently compensate for temperature rise of the toaster structure so that with a given setting of the parts, successive slices of bread can be toasted to the same degree irrespective of the temperature rise of the toaster structure. It is therefore obvious that the device embodying my invention does not require an auxiliary compensating element but that compensation for temperature variation of the toaster itself is accomplished automatically or is inherent in the structure as hereinbefore described.

A slight downward pressure on part 147 of the latch release means will effect release of the latch independently of the thermal control means hereinbefore described so that it is possible to effect release of the latch independently of the thermal control means should this be necessary or desirable.

It will be noted that the thermally-expansible rods are positioned near the bottom of the toasting chamber, subjected to radiant heat from an auxiliary heater and to heat from the main heating element and to a through draft of cooling air. An expansion rod which was thermally energized in a toasting operation is caused to be moved out of close heat receiving relation with the auxiliary heating element and into a cooler zone of temperature where the draft of ventilating air is still quite cool, while at the same time the next succeeding expansion rod is moved into close heat receiving relation with the auxiliary heating element during the next succeeding operation of the toaster. During the next succeeding operation, the first used expansion rod is located close to the base plate and subjected to a through draft of ventilating air at substantially its entering temperature.

While I have illustrated and described a switch as controlling the energization of both heating elements, I may use the switch to control the energization of only the auxiliary heating element.

I wish to here point out that the location of the rotator comprising more particularly the expansion rods 137 in the toasting chamber near the bottom thereof has a further important advantage in that it is possible to provide a small amount of ventilation in the crumb tray as shown more particularly in Figs. 3 and 4 of the drawings where an air inlet opening is indicated by 193, this having the result that the expansion rods will cool at the proper rate to obtain the compensating effect hereinbefore described. It is further obvious that while one of said rods is being heat energized, the other rods are cooling, the maximum cooling effect being obtained on that rod which is lowermost during any toasting operation.

I claim as my invention:

1. In an automatic electric toaster, the combination with a pair of spaced electric heating elements, a switch controlling the energization of the heating elements, biased to open position, means to move the switch to closed position, a latch means to hold the switch in closed position, an auxiliary electric heating element located between the spaced electric heating elements and a support for the auxiliary heating element shielding said auxiliary heater from direct radiation of heat thereto from said spaced heating elements, of a plural-element thermal latch-release means including a rotatable shaft, a pair of discs fixed in spaced positions on said shaft, a plurality of peripherally-spaced expansion rods having one end fixed to one disc and the other end axially movable through the other disc, means to effect turning movement of the shaft, discs and rods simultaneously with each switch-closing movement of the switch moving means to locate one of said expansion rods in heat receiving relation to the auxiliary heating element and in aligned position relatively to said latch means to cause release thereof after a time interval, the length of which varies with toaster temperature.

2. In a vertical electric toaster, the combination with a casing having a slot in its top surface, a pair of spaced main heating elements in said casing, intermediate walls in the casing cooperating with said main heating elements to constitute a toasting chamber located below said slot, a switch for said heating elements biased to open position, a bread slice support in the toasting chamber vertically movable into toasting and non-toasting positions, a spring biasing the switch to open position and the support to non-toasting position, a manually-actuable means movable in a vertical path to effect closing of the switch and movement of the support into toasting position and a latch for holding said switch closed and said support in toasting position, of thermally-actuable means for effecting release of the latch after operating lengths of time varying with the temperature of the toaster including an auxiliary electric heating element in the toasting chamber between the spaced main heating elements near the bottom thereof, a support for the auxiliary heating element closely adjacent to it, a rotator below said auxiliary heating element comprising a pair of spaced rotatably mounted discs, a plurality of expansion rods spaced peripherally of the discs with one end of each rod fixed in one disc and with the other end of each rod extending movably through the other disc, means on said manually-actuable means for turning the rotator to bring an expansion rod into close proximity to the auxiliary heating element and into a position alined with the latch simultaneously with the closing of the switch and movement of the support into toasting position, said expansion rod engaging the latch to effect release thereof after a period of time, the length of which varies with toaster temperature.

3. In a toaster, the combination with a pair of spaced vertically-extending main electric heaters, a control switch therefor biased to open position, a manually-actuable element connected to effect closing of said switch and a latch means to hold said switch in closed position, of a thermally-actuable means to effect release of said latch means including an auxiliary electric heater located between the spaced main heaters near the bottom ends thereof and controlled by said control switch, means to shield said auxiliary electric heater from radiant heat directly from the main electric heaters, a plurality of expansion bars located between said spaced main heaters and below said auxiliary heater and mounted for movement in a circular path, means for bringing a rod into heat receiving relation to and below said auxiliary heater simultaneously with a switch-closing movement of the manually-actuable element and into alined position relatively to said latch means to actuate the same upon rise of temperature of said rod an increase of its length to a predetermined degree.

4. In a toaster, the combination with a pair of spaced vertically-extending main electric heaters, a bread slice support vertically movable therebetween into toasting and non-toasting positions and biased to non-toasting position, a manually-actuable element connected to move the bread support into toasting position and a latch means to hold the bread support in toasting position, of a latch release means including an auxiliary electric heater, a switch controlling the auxiliary electric heater, biased to open position and connected to be closed by said manually-actuable element when moving the bread slice support into toasting position and to be held in closed position by said latch means a shaft positioned below the main and the auxiliary electric heaters, a pair of spaced discs fixedly mounted on said shaft, a plurality of peripherally-spaced pins on one disc, a plurality of expansion rods supported by said discs with one end of each rod fixed in one disc and with the other end of each rod extending movably through the other disc and below said main and auxiliary heaters, means on said manually-actuable element for engaging a pin on said one disc when moving said bread support into toasting position and near the end of such movement to move one of said expansion rods into position below said auxiliary heater to receive heat therefrom and in position to actuate said latch on predetermined rise of temperature and increase of length of said rod.

5. In a toaster, the combination with a pair of vertically-extending main electric heaters, front and rear walls cooperating with said heaters to constitute a toasting chamber, a control switch for said heaters, a bread slice support in the toasting chamber movable to toasting and to non-toasting positions, a spring connected to bias to switch to open position and the bread-support to non-toasting position, a manually-actuable element connected to effect closing of the switch and movement of the bread support to toasting position and a latch for holding the switch closed and the bread support in toasting position, of a thermally-actuable latch release means including an auxiliary electric heater located in the toasting chamber near the bottom edge of the main heaters and controlled by said switch for the main heaters, means to shield said auxiliary heater from radiant heat directly from said main heaters, a plurality of expansion rods located between said main heaters and below said auxiliary heater and mounted for movement in a circular path, means pivotally supported from said manually-actuable element to bring a rod into heat-receiving relation to said auxiliary heater and into position relatively to said latch to actuate the same to release position upon rise of temperature and increase of length of the rod to a predetermined degree.

6. In an automatic electric toaster, the combination with a main and an auxiliary electric heating element, means to screen said auxiliary heating element from direct radiant heat from the main heating element, a switch for controlling the energization of both heating elements and spring biased to open position and a latch adapted to hold the switch in closed position of a rotator comprising a shaft, a pair of spaced discs fixed thereon, a plurality of parallel-axis expansion rods fixedly supported by one of said discs and movably supported by the other disc, and a single means movable in a given direction to initiate successive toasting operations, each movement of said single means in a given direction being effective to cause closing of said switch and latching it in closed position, and movement of one expansion rod out of heat receiving relation with the auxiliary heating element and movement of another expansion rod into heat receiving relation with said auxiliary heating element and into alinement with said latch to cause release thereof after a length of time varying with toaster temperature, said single means being returnable to its initial position by said biasing spring, upon release of the latch.

7. In an automatic toaster, the combination with a pair of spaced main electric heating elements, an auxiliary electric heating element located between said main heating elements near the bottom ends thereof, a switch for controlling the energization of the main and the auxiliary heating element, a spring to bias said switch to open position and a latch adapted to hold the switch in closed position, of a rotator positioned between said main heating elements and below said auxiliary heating element and comprising a plurality of spaced parallel-extending expansion rods and means movable in a given direction adapted to effect closing of said switch and latching it in closed position, movement of one of said expansion rods into close heat receiving relation with said auxiliary heating element and into axial alinement with said latch to cause release thereof after a time interval, movement of said one expansion rod compelling movement of another rod out of heat receiving relation with the auxiliary heating element and into a cooling zone, said means movable in a given direction being adapted to be returned to its initial position by said biasing spring after release of the latch.

8. In an automatic electric toaster, the combination with a main and an auxiliary electric heating element screened from direct radiant heat from the main heating element, a switch for controlling the energization of the main and auxiliary heating elements, a bread slice support adapted to be moved into toasting and non-toasting position relatively to said main heating element, a single spring adapted to bias the switch to open position and the bread slice support to non-toasting position and a latch adapted to hold the switch in closed position and the bread slice support in toasting position, of a rotator comprising a plurality of spaced parallel-extending expansion rods and a single means adapted to be moved in one direction to cause movement of the bread slice support into toasting operation and of the switch into closed position and to cause latching of the bread slice support in toasting position and of the switch in closed position, and movement of one of said expansion rods away from said auxiliary heating element and of another of said expansion rods into close heat receiving relation with said auxiliary heating element and into axial alinement with said latch to cause release thereof after a time period, the length of which varies with toaster temperature, said single means being returnable to its initial position by said spring after release of said latch.

9. A toaster as set forth in claim 2 and including means on said latch extending outwardly through the casing and manually-actuable to effect release of the latch at any time during a toasting operation.

10. A toaster as set forth in claim 1 and including a star wheel on said shaft at one end thereof and a roller spring pressed into engagement with said star wheel to locate and hold said one rod in said alined position.

MURRAY IRELAND.